United States Patent Office

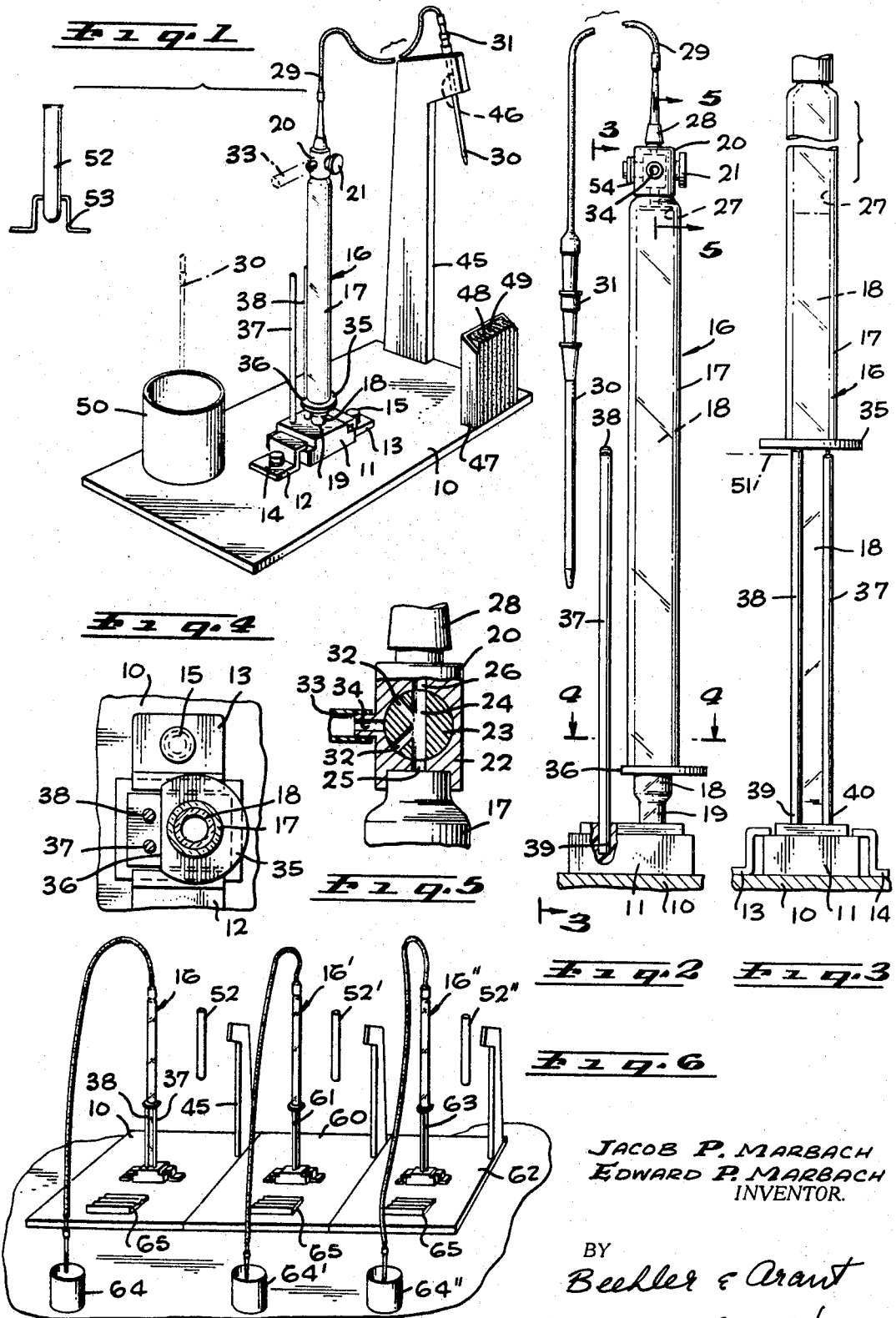

3,389,835
Patented June 25, 1968

3,389,835
STATIONARY ANALYTICAL SAMPLING DEVICE
Jacob P. Marbach, 17736 Kinzie St., Northridge, Calif. 91324, and Edward P. Marbach, 4607 Marwood Drive, Los Angeles, Calif. 90065
Filed Sept. 19, 1967, Ser. No. 668,909
10 Claims. (Cl. 222—135)

ABSTRACT OF THE DISCLOSURE

The invention has reference to an analytical sampling device making use of one or more syringes, of the customary glass laboratory character, for withdrawing carefully measured samples of one or more fluids from a source of supply for subsequent analysis. The sampling device is stationarily mounted upon an appropriate base in such fashion that only the sampling needle needs to be held in the hands of the operator, stationarily mounting the movable plunger of the syringe in an inverted position and applying the barrel of the syringe over the plunger in telescoping relationship. A gauge member is also stationarily mounted adjacent the plunger so the flange of the barrel, when raised from a bottomed position and placed upon the top of the gauge member, will positively fix the relationship of the barrel to the plunger and thereby precisely determine the volume of the barrel which is to be filled with the fluid to be sampled. A flexible tube interconnects the upper end of the barrel with the sampling needle, so that the sampling needle can be readily inserted into a beaker or other appropriate vessel initially holding the fluid to be sampled. In the alternative, the sampling needle may be stationarily mounted in its support and the vessel brought up to it for the operation.

The invention is an improvement in applicants' Patent No. 3,236,423.

Background of the invention

One of the common daily needs in laboratory analysis is the analysis of blood. Determinations of this kind are taken routinely and daily by the thousands, but precise determination is critical in that it involves the life and health of humans. In order to have such determinations dependable, each analysis must be clean and clear of every preceding analysis so that there is no inadvertent contamination. The common practice heretofore has been to make use of a separate measuring device, commonly termed a pipet, for each unknown fluid to be analyzed and to dilute it with a measured quantity of diluent. No means has heretofore been proposed for washing the pipet clear of the unknown and consequently, once used, the pipet has to be washed before reuse. This practice requires great quantities of glassware and the perpetual need for cleaning substantial quantities of such glassware each and every day. Further still, the pipet system of measuring the unknown fluid requires considerable physical effort in that the unknown is drawn into the pipet by mouth suction and the quantity measured in the pipet by discharging any excess or drawing in any deficiency. Further still, in measuring in this fashion, measurement is not precise, depending as it does on the personal equation. There is accordingly a definite limit to the number of analyses which can be accomplished, due in part to the fact that the technician may become fatigued. Fatigue is also a considerable factor in comparing the preciseness and dependability of the analysis.

In alleviating some of these deficiencies applicants' prior invention disclosed in Patent No. 3,236,423 proposed an automatic proportioning syringe wherein the plunger of the syringe is provided with one or two gauge rods which cooperate with the flange of the barrel of the syringe to automatically and precisely determine the amount of fluid which is drawn into the barrel. When two gauge rods are employed, they are made of different length. The plunger is withdrawn from the barrel drawing into it a relatively large volume of diluent in precisely measured amount through the sampling needle, attached to the barrel. The barrel is then drawn out a very slight distance further determined by the difference in length of the gauge rods and in this way a fixed limited amount of a second fluid is drawn into the sampling needle. Upon completion of the taking of successive measured amounts of fluid the plunger is extended into the barrel first discharging the last mentioned quantity of fluid and then discharging the diluent so that during the discharge the last fluid sampled is washed entirely clean of the apparatus by the flow of diluent. Applicants' patent differs from the prior art in that the gauge rods automatically and positively establish a precise proportioning of the fluids drawn into the barrel. Despite these improvements, applicants' invention as disclosed in Patent 3,236,423 is a hand held apparatus and requires use of two hands in order to manipulate it, and also requires that the automatic proportioning syringe therein disclosed be moved bodily first to the container for the diluent, then to the container for the fluid to be analyzed, and finally to the vessel provided for reception of both of them in mixed condition.

Summary of the invention

The invention herein disclosed makes use to a substantial extent of the automatic proportioning syringe of the prior art, but contemplates mounting the syringe in fixed position upon an appropriate base so that it does not need to be hand held, except only for the sampling needle, which, for one procedure, is moved from one position to another, first to pick up fluids to be sampled and thereafter to deposit them in an appropriate receptacle.

Among the objects of the invention is to provide a new and improved stationarily mounted analytical sampling device which is capable of saving a substantial amount of time in the selection of fluids to be sampled, which minimizes fatigue, which frees the hands of the operator appreciably during the course of the sampling procedure without hazard to its accuracy, and which is so set up that there is no penalty in either accuracy or effectiveness should the procedure be interrupted momentarily. The invention further improves manipulation of the device at the customary laboratory bench or table, eliminates the prospect of collecting air bubbles in the fluid sampled and is so arranged that the sampling needle can be readily wiped clean and placed temporarily at rest in a position which minimizes the prospect of contamination.

In the drawings:

FIGURE 1 shows a side perspective view of the complete set up of a typical example of the stationary analytical sampling device.

FIGURE 2 is a side elevational view partially broken away showing the barrel in bottomed position preparatory to performance of a sampling operation.

FIGURE 3 is a side elevational view at right angles with respect to the view of FIGURE 2, but showing the apparatus withdrawn to the position occupied when samples of two separate fluids have been drawn into the barrel.

FIGURE 4 is a cross-sectional view taken on the line 4—4 of FIGURE 2.

FIGURE 5 is a fragmentary longitudinal sectional view taken on the line 5—5 of FIGURE 2.

FIGURE 6 is a side perspective view of a multiple set-up.

Description of the chosen embodiments

In an embodiment of the invention chosen for the purpose of illustration, there is shown a relatively large rectangular base 10 adapted to be placed upon a laboratory table or in any convenient location where a technician can sit or stand adjacent to it for operation. Centerably disposed on the base 10 is a block 11 which is fastened in place with the aid of two brackets 12 and 13 attached releasably to the base by thumbscrews 14 and 15. A syringe, indicated generally by the reference character 16, consists in part of a barrel 17 and plunger 18. Contrary to customary procedure a lower end 19 of the plunger is stationarily mounted in the block 11 so that the plunger 18 is supported in vertical position. The barrel 17 slides freely over the plunger 18 moving up and down in the usual fashion. At the upper end of the barrel is a three-way valve 20 manipulated by a handle 21. The valve 20 consists of a valve housing 22 in which is a rotating valve element 23, attached to the handle 21. A passage 24 through the valve element 23 interconnects adjacent passages 25 and 26. The passage 25 is in communication with an interior chamber 27 of the barrel 17 and the passage 26 is in communication through a fitting 28 with a flexible tube 29. The value element 23 is additionally provided with secondary passages 32, 32' which are dead ended in the adjustment of FIGURE 5 but which upon counter-clockwise rotation of the valve element 23 interconnect the chamber 27 with a diluent line 33 through a passage 34. The diluent line may be permanently connected to a reservoir of diluent (not shown). A hollow needle 30 is connected to the other end of the tube by means of a fitting 31.

As is customary, the barrel 17 is provided with a flange 35 which differs somewhat from conventional flanges in that there is provided a clearance 36 at one side of the flange, the clearance actually being a cutaway portion of the flange, in the embodiment chosen. A multiple gauge member is provided consisting in this instance of two separate gauge rods 37 and 38. A lower end 39 of the gauge rod 37 is anchored in the block 11 holding the gauge rod in vertical position, parallel to the barrel 17 and plunger 18, and spaced a slight distance from both of them, as clearly shown in FIGURES 1, 2, and 3. A lower end 40 of the gauge rod 38 is similarly anchored in the block 11 mounting the second gauge rod 38, which in this instance is slightly longer, in spaced parallel relationship to the gauge rod 37 and likewise the barrel 17 and plunger 18. As shown to best advantage in FIGURE 4, the gauge rods 37 and 38 occupy a position in the clearance 36 previously described as being a cutout portion of the flange 35.

For convenience there is provided a bracket 45 likewise mounted upon the base 10 having at its upper end a recess 46 for releasably holding the sampling needle 30. A holder 47 mounted upon the base 10 is provided with an absorbent material arranged in folds 48 and 49, useful in wiping excess fluid from the exterior of the needle 30 when in use. By making the folds of the absorbent material relatively firm, they may serve as a holder for the needle when not in use.

To make use of the device described, the apparatus is set up as pictured in FIGURE 1. The valve element 23 is rotated counterclockwise to interconnect the chamber 27 with the diluent line 33 through the passage 32, 32'. The barrel 17 is then lifted and rotated slightly until the flange 35 is moved to a position overlying the shorter of the two rods, namely the rod 37, and the flange is then permitted to rest upon the top of the rod 37 at the location indicated by the broken line 51. The valve 20 is then rotated to the position shown in FIGURE 5 by use of the handle 21. The needle 30 is then inserted in a test tube 52 containing the fluid to be sampled and tested, blood for example, with the test tube, if desired, held in upright position in an appropriate conventional holder 53 or, in the alternative, brought to the needle 30 while the needle is held in the bracket 45. The barrel 17 is then lifted an additional short distance, namely a distance equal to the difference in length of the rods 37 and 38, and the barrel then rotated sufficiently to have the flange 35 rest on the top of the rod 38, as shown by the solid line position of FIGURE 3. The difference in elevation between the top of the rod 37 and rod 38 determines the amount of movement of the barrel relative to the plunger and accordingly the precise amount of additional fluid which may be drawn into the apparatus. This movement is, however, so small that the fluid sampled will be drawn only into the needle 30 or at most into a portion of the tube 29 and will never be drawn into the apparatus in such quantity that it passes the valve 20. If desired, the valve element 23 may be provided with a conventional spring return 54 and stop to automatically return it to the position of FIGURE 5 after diluent has been charged into the chamber 27.

The apparatus is then ready for discharging both the sampled fluid and the diluent into an appropriate receptacle (not shown). This is accomplished by inserting the needle into the receptacle, making sure that the valve 20 is in the position of FIGURE 5, and then lowering the barrel 17 from the uppermost position shown in FIGURE 3 to the lowermost or bottomed position shown in FIGURE 2. Since the diluent is in abundance, it washes the fluid sampled clean of the needle 30 and the device is then immediately ready for a second operation picking up first a diluent and then a quantity of fluid to be sampled.

Should an operator wish to dispense with manipulation of the valve 20, it may be permitted to remain held in the position of FIGURE 5 by the spring return and the needle itself inserted in a beaker 55 containing an appropriate diluent and the barrel 17 lifted as described for the operation when the valve element 23 is open to the diluent line 33, namely until the flange 35 rests on the shorter rod 37. The needle is then wiped dry of diluent by passing it between the folds 48 and 49 of absorbent material and then inserted in the test tube and the same succeeding step performed as has already been described.

Where multiple quantities of different fluids need to be selected for ultimate mixing, a multiple set-up of the devices can be made use of as illustrated in FIGURE 6. These may be either two position devices such as that exemplified by FIGURES 1 through 5 inclusive or merely one position devices using only single gauge members. As shown in FIGURE 6, an apparatus comparable to that shown in FIGURES 1 through 5 inclusive is mounted upon the base 10 at the left of the figure. A base 60 mounts a similar syringe 16' which is provided with only a single gauge rod 61. The apparatus is otherwise identical to that shown mounted upon the base 10. Similarly, a syringe 16'' is shown mounted upon a base 62, this syringe likewise being provided with but a single gauge rod 63. The syringe arrangement, however, is otherwise like that described in connection with FIGURES 1 through 5 inclusive. In making use of this form of the device, the syringe 16 on the base 10 is first employed to measure a quantity of diluent and quantity of fluid to be sampled in the proportions previously indicated and the fluid then deposited in an appropriate receptacle 64. The apparatus embodied in part in the syringe 16 may then be manipulated in a comparable fashion to withdraw a precisely measured amount of a third fluid and this may then be ejected into the receptacle 64 or, preliminarily, into a receptacle 64'. Should a fourth fluid be needed for the analysis, it can be withdrawn from an appropriate source in a precisely measured amount by manipulation of the syringe 16'' and the precisely measured amount then deposited in either the receptacle 64 or other receptacle 64''.

In these devices a holder 65 may be provided for appropriate instruments, if desired. For convenience in illustration, test tubes 52, 52' and 52'' have been suggested schematically. It will be appreciated further that the gauge rods 61 and 63 may be made virtually any length to measure any desired precise amount of third and fourth fluids to be combined with the first two fluids. Further still, although gauge rods have been specifically described herein as separate rods of different length, it will be appreciated that the gauge members may be employed of the character disclosed in applicants' copending application above referred to or in applicants' prior patent, the engagement of the flange and gauge member being a progressive sliding engagement as therein shown for ease in completing the maneuver of shifting the flange 35 into position upon the precisely desired point on the gauge member.

While the invention has herein been shown and described in what is conceived to be the most practical and preferred embdiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A stationarily mounted analytical sampling device comprising a base including a block on the base, a plunger fastened at one end to the block and having a free end extending substantially vertically upwardly, and a hollow barrel extending slidably over said plunger, a gauge member having one end fastened to said block adjacent and spaced from said plunger, said gauge member having a free and extending substantially vertically upwardly and in spaced relationship to said plunger and said barrel, a flange on the lower end of said barrel, said flange having a clearance at one portion of the perimeter through which said gauge member extends, a sampling connection at the upper end of said barrel, a tube attached at one end thereof to said connection, and a hollow needle attached to the other end of said tube, said barrel being movable from a lowermost bottomed position on said plunger to an uppermost position with said flange resting on a top portion of said gauge member, whereby to draw a predetermined quantity of said fluid through said connection into said barrel.

2. A sampling device according to claim 1 wherein there is an engagement between said flange and said gauge member at a plurality of different vertical locations for said barrel, whereby successive quantities of different fluids may be drawn into the barrel by moving the barrel first to a position where engagement is at the lowermost location and then moving the barrel to a higher of said locations.

3. A sampling device according to claim 1 wherein said gauge member includes flange engaging portions at two different levels whereby successive quantities of different fluids may be drawn into the barrel by moving the flange to first engage the lower of said portions and then to engage the upper of said portions.

4. A sampling device according to claim 1 wherein said gauge member comprises two rods of different length and spaced from each other, both of said rods extending through the clearance in the flange, whereby successive quantities of different fluids may be drawn into the barrel by moving the flange to first engage the shorter of said rods and then to engage the longer of said rods.

5. A sampling device according to claim 1 wherein there is a bracket and a cradle on said bracket releasably holding said needle in a selected position.

6. A sampling device according to claim 1 wherein there is attachment means releasably holding said block on said base.

7. A sampling device according to claim 1 including a three-way valve between said barrel and said tube, a diluent passage in said valve, a passage in said valve in communication with said tube and a passage in said valve in communication with said sampling connection, said valve having one position connecting said sampling connection with said diluent passage whereby to supply diluent to said barrel and another position connecting said sampling connection with said tube whereby to supply fluid to be sampled to said barrel.

8. A sampling device according to claim 7 wherein there is a spring return on said valve to automatically releasably hold the valve in position interconnecting said tube and said sampling connection.

9. A sampling device according to claim 1 wherein there is a plurality of blocks and associated plungers, gauge members and barrels.

10. A sampling device according to claim 1 including a wiper for said needle comprising folds of absorbent material and a holder mounting said material in position on said base.

References Cited

UNITED STATES PATENTS 3,127,062   3/1964   Feichtmeir et al. _____ 23—253
3,297,558   1/1967   Hillquist _____ 23—253 X ROBERT B. REEVES, *Primary Examiner.*

H. S. LANE, *Assistant Examiner.*